(No Model.)

J. O. JOYCE.
SCREW JACK.

No. 390,605. Patented Oct. 2, 1888.

Attest:
J. Watson Sims
F. Simmons

Inventor
Jacob O. Joyce
by Wood & Boyd
his Attorneys

UNITED STATES PATENT OFFICE.

JACOB O. JOYCE, OF DAYTON, OHIO.

SCREW-JACK.

SPECIFICATION forming part of Letters Patent No. 390,605, dated October 2, 1888.

Application filed May 3, 1888. Serial No. 272,717. (No model.)

*To all whom it may concern:*

Be it known that I, JACOB O. JOYCE, of Dayton, in the county of Montgomery and State of Ohio, have invented certain new and useful Improvements in Screw-Jacks, of which the following is a specification.

My invention relates to that class of jacks commonly called "telescope screw-jacks."

The object of my invention is to provide a suitable means for operating the jack in cramped or narrow spaces, where only a short sweep of the lever can be obtained, all of which is to be set forth in the description of the accompanying drawings, making a part of this specification, in which—

Figure 1:
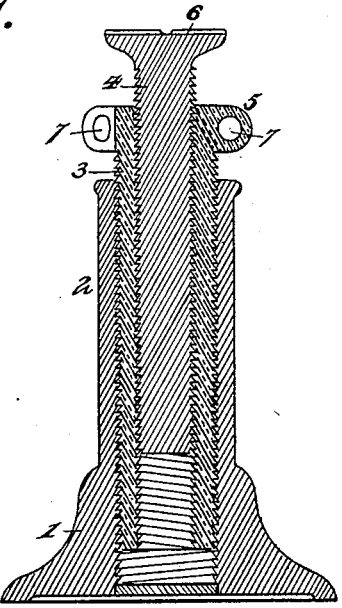
Figure 2:
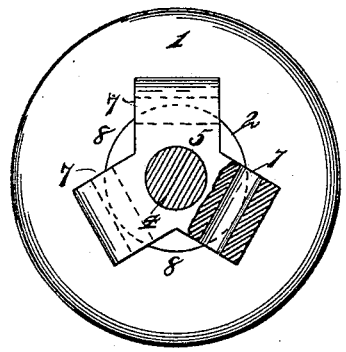
Figure 3:
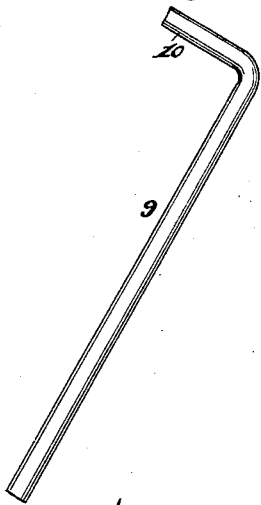

Figure 1 is a central vertical section of my improvement. Fig. 2 is a top plan view of the nut, partly in section. Fig. 3 shows a bent lever.

1 represents the base of the jack-frame.

2 represents the cylindrical shell.

3 represents a cylindrical nut having threads on its outer periphery engaging with the threads on the inner periphery of the shell 2, and the threads on the inner periphery of the nut engage with threads on the outer periphery of the screw-rod 4.

5 represents a nut rigidly secured to the cylindrical nut 3. It is provided with screw-threads on its inner periphery, which engage with the threads of the screw-rod 4, so that as the nut 5 is turned both the inner and outer screws serve to elevate the rod 4.

6 represents a cap on top of screw-rod 4, on which the load rests. In order to furnish a strong nut, and one which can be readily worked, I provide the nut-head 5 with three horizontal sockets, 7, which are at right angles to the radii of the screw-rod and cylindrical nut. These sockets 7 are open at both ends, and between said sockets are recesses or openings 8 to permit the ready engagement of a lever by means of which the nut can be easily turned in a small space, it being obvious that three horizontal sockets open at both ends will afford six points for the engagement of the lever at such intervals that each successive engagement of the lever will enable the nut to be advanced farther.

In Fig. 2 I have shown one of the sockets 7 in section, and the other sockets are indicated by dotted lines. Between each of these sockets are the openings 8, so as to allow the ready engagement of the turning-lever with said sockets.

The operation is as follows: The turning-lever may be inserted in one of the sockets and the nut turned one-sixth of a revolution. The lever can be removed and reversed and placed in another one of the sockets. By the use of the bent lever 9 (shown in Fig. 3) the knee 10 can be inserted in any one of the sockets 7, and the nut turned a little way and then taken out and reversed and put in the adjacent end of the next socket, and the nut turned a little more until the lever can be reversed and put in the opposite end of the last-mentioned socket, and so on, and by this means the nut can be turned in a contracted space. This form of nut is compact, strong, and convenient.

My invention differs from prior jacks having a screw raised and lowered by rotating a nut screw-threaded in a shell in that the several sockets extend at right angles to the radii of the nut and screw, whereby both ends of each socket are utilized for the insertion of the lever to turn the nut.

Having described my invention, what I claim to be new is—

A screw-jack comprising the internally-threaded shell 2, the screw-rod 4, and the cylindrical internally and externally threaded nut 3, having a head, 5, provided with three horizontal sockets, 7, and intermediate recesses or spaces, 8, said sockets being arranged at right angles to the radii of the nut and open at both ends to permit the engagement therewith of an operating-lever, substantially as described.

In testimony whereof I have hereunto set my hand.

JACOB O. JOYCE.

Witnesses:
 ROBERT ZAHNER,
 J. WATSON SIMS.